(12) United States Patent
Jøsang et al.

(10) Patent No.: US 9,876,802 B2
(45) Date of Patent: Jan. 23, 2018

(54) MULTI-MODE COMPUTER WITH SELECTOR

(71) Applicant: Universitetet I Oslo, Blindem (NO)

(72) Inventors: Audun Jøsang, Hvalstad (NO); Eric Fouchard, Bruz (FR)

(73) Assignee: UNIVERSITETET I OSLO, Oslo (NO)

( * ) Notice: Subject to any disclaimer, the term of this patent is extended or adjusted under 35 U.S.C. 154(b) by 0 days.

(21) Appl. No.: 14/434,807

(22) PCT Filed: Oct. 11, 2013

(86) PCT No.: PCT/EP2013/071356
§ 371 (c)(1),
(2) Date: Apr. 10, 2015

(87) PCT Pub. No.: WO2014/057123
PCT Pub. Date: Apr. 17, 2014

(65) Prior Publication Data
US 2015/0271184 A1 Sep. 24, 2015

(30) Foreign Application Priority Data

Oct. 12, 2012 (GB) .................................. 1218389.3

(51) Int. Cl.
*G06F 12/14* (2006.01)
*H04L 29/06* (2006.01)
(Continued)

(52) U.S. Cl.
CPC ............ *H04L 63/105* (2013.01); *G06F 21/74* (2013.01); *G06F 21/84* (2013.01);
(Continued)

(58) Field of Classification Search
None
See application file for complete search history.

(56) References Cited

U.S. PATENT DOCUMENTS 5,596,718 A 1/1997 Boebert et al.
5,822,435 A * 10/1998 Boebert .................. G06F 21/42
380/200
(Continued)

FOREIGN PATENT DOCUMENTS

EP 1 329 787 A2 7/2003
EP 1 526 426 A2 4/2005

OTHER PUBLICATIONS

Eptstein, J., et al.: "User Interface for a High Assurance, Windowing System", Computer Security Applications Conference, 1993, 9th Annual Orlando, FL, pp. 256-264.
(Continued)

*Primary Examiner* — Brandon Hoffman
(74) *Attorney, Agent, or Firm* — Eversheds Sutherland (US) LLP

(57) ABSTRACT

There is disclosed a computing apparatus including a first context within which first processing activity may be performed and a second context within which second processing activity may be performed independent of the first processing activity, the apparatus further may include input and/or output channels with which the first and second contexts may communicate and a switch function operated by a selector; whereby operation of the selector by a user selectively allows communication between the first context and/or the second context (of the first part) and the input and/or output channels (of the second part). An indicator is provided to indicate which context is in communication with the input/output channels.

12 Claims, 1 Drawing Sheet

(51) Int. Cl.
*G06F 21/74* (2013.01)
*G06F 21/84* (2013.01)
*H04W 12/08* (2009.01)
*H04W 88/02* (2009.01)

(52) U.S. Cl.
CPC .. *H04L 63/1441* (2013.01); *G06F 2221/2113* (2013.01); *G06F 2221/2153* (2013.01); *H04W 12/08* (2013.01); *H04W 88/02* (2013.01)

(56) References Cited

U.S. PATENT DOCUMENTS

| | | |
|---|---|---|
| 8,270,963 B1 | 9/2012 | Hart et al. |
| 2004/0123118 A1 | 6/2004 | Dahan et al. |
| 2005/0091530 A1 | 4/2005 | Avraham et al. |
| 2009/0083862 A1 | 3/2009 | Avraham et al. |
| 2009/0144510 A1* | 6/2009 | Wibling ............... G06F 9/5016 711/147 |
| 2009/0320048 A1* | 12/2009 | Watt ..................... G06F 9/4812 719/319 |
| 2010/0192230 A1* | 7/2010 | Steeves .................. H04L 63/08 726/26 |
| 2012/0317617 A1 | 12/2012 | Hart et al. |
| 2013/0157645 A1 | 6/2013 | Hart et al. |

OTHER PUBLICATIONS

Kent Are Varmedal, et al.: "The OffPAD: Requirements and Usage" Jun. 2013, Network & System Security, Springer Berlin Heidelberg, pp. 80-93.

* cited by examiner

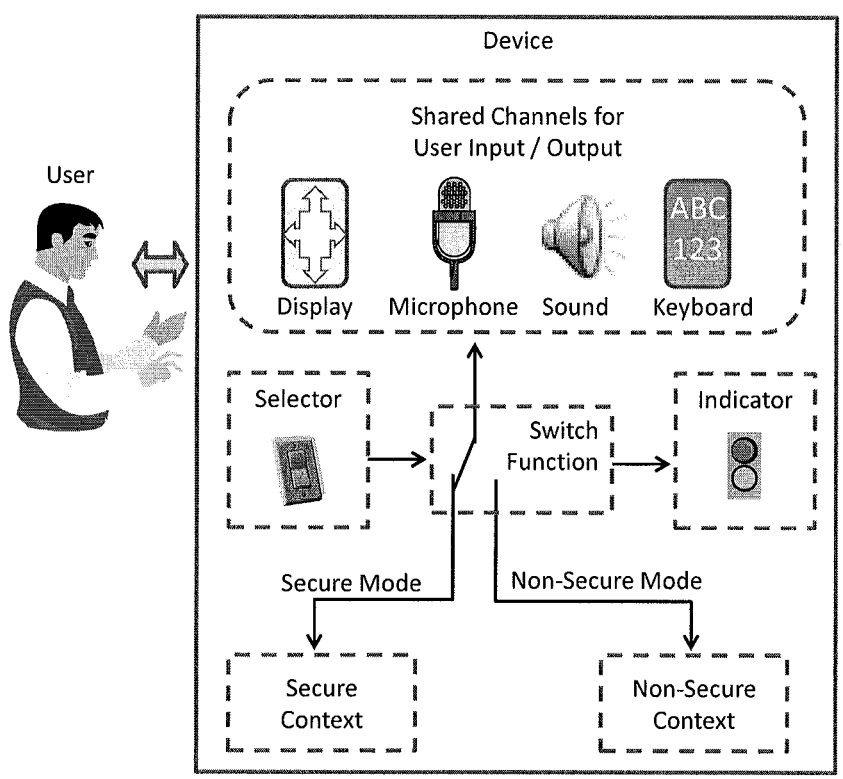

MULTI-MODE COMPUTER WITH SELECTOR

RELATED APPLICATIONS

The present application is a national phase filing related to International Application No. PCT/EP2013/071356, filed on Oct. 11, 2013, which claims priority to GB 1218389.3, filed on Oct. 12, 2012.

Technical Field

The present invention relates to multi-context computing apparatus, and in particular, to such apparatus where the contexts may be connectable to input/output channels.

BACKGROUND OF THE INVENTION

Computing platforms can potentially be compromised through attacks and malware infections, where the likelihood of compromise increases with the degree of threat exposure as well as with the number and the severity of vulnerabilities in and around the computing platform. There will always be a certain likelihood of compromise, because vulnerabilities can never be completely eliminated, and threats can never be fully neutralised.

IT applications can have different sensitivity levels, and different activities will expose computing platforms to different threat levels. Example of high sensitivity applications are online banking and management of access credentials such as passwords. Examples of activity with high threat exposure are accessing unknown web sites and installing unknown external devices such as USB plug-in drives, in which cases there is a relatively high likelihood that the computing platform can be attacked and compromised in some way, which in turn could negatively affect the security of sensitive applications. It is therefore not desirable nor advisable to use the same computing platform both for high sensitivity applications and for engaging in activities affected by high threat exposure.

Ideally, two separate platforms should be used, where one is used for sensitive applications and the other for activities with high threat exposure. By using different computing platforms exclusively for different environments and for different applications, the likelihood of an attack originating from an environment of high threat exposure spreading to and compromising a high sensitivity application is reduced.

Another good reason for using multiple separate computing platforms is that they can cross-check each others' integrity. In case one computing platform is compromised, this situation can be detected and possibly corrected by the other computing platform. In an architecture where one computing platform is used to cross-check the integrity of another computing platform it would be necessary for attackers to compromise both computing platforms in order to execute a successful attack. This method of multi-factor security obviously leads to more robust security and reduces the likelihood of successful attacks.

However, people typically use the same computing platform for both, which is problematic. This is because handling multiple devices can be relatively cumbersome, resulting in poor usability. For example, users would have to procure and manage multiple devices, which in case of mobile computing would have to be carried around.

SUMMARY OF THE INVENTION

A solution to this problem is to have a computing platform designed to operate with two or more separate security contexts. The term dual security context architecture is here used to denote this type of computing platform. "multi-context architecture" may also be used particularly when more than two contexts are provided. Various forms of dual security context architectures already exist today. A dual security context platform can e.g. be a device with two separate microprocessors such as mobile phones that have a SIM microprocessor in addition to a microprocessor for the phone itself. Another example of dual security contexts is an OS (Operating System) where processes execute in either User Mode or Root/Admin Mode, where each mode enforces its own security policy. A third example of a dual context architecture is when the device can operate with the Internet and other networks either connected (online) or disconnected (offline). A fourth example of a dual security context architecture is a computing platform which instead of a traditional OS runs a hypervisor that hosts multiple VMs (Virtual Machines, also called Guest Operating Systems), where the user either interacts with the hypervisor to manage the VMs, or the user interacts directly with one of the VMs. The latter example can also be described as a multi-context architecture, where the hypervisor provides a management context, and where each VM provides a separate operation context.

The term "computing context" is here used in the sense of a computing environment that provides a significant degree of separation and isolation from other computing contexts, as described in the examples above.

In the dual security context architecture, each context is typically used for separate sets of activities with regard to security, so that it is meaningful to use the terms Secure Context and Non-Secure Context to denote the two contexts, but the specific names are in fact arbitrary, and do not necessarily reflect the inherent security strength of the contexts. The main point is that the two contexts have different properties with regard to security. This specification defines three different interpretations of security context names, described as interpretations A, B and C below.

A. Security context according to sensitivity: The context name denotes the intended purpose of the context, so that Secure Context="context for relatively high sensitivity activities", and Non-Secure Context="context for relatively low sensitivity activities". An example of this interpretation is when installing two separate and technically equivalent VMs on a platform, and consider one of them as the Secure Context reserved for sensitive Internet activities such as online-banking, and the other as the Non-Secure Context for general-purpose Internet activities.

B. Security context according to privilege: The context name denotes the relative access privilege level of processes running within the security context. More specifically, the Secure Context is used for executing processes with high access privileges. Correspondingly, the Non-Secure Context is used for executing processes with low access privileges. An example of this interpretation related to OS is to define Secure Context=Admin/Root Mode, and Non-Secure Context=User Mode, because processes in Admin/Root mode have higher system privileges that processes in User Mode. Another example is to define hypervisor=Secure Context, and VM=Non-Secure Context, because the hypervisor has higher system privileges than a VM. Readers of this document should be aware of the potential confusion around this interpretation, e.g. because OS User Mode typically provides superior protection against malware and misuse than Admin/Root Mode, because malicious processes running in OS User mode have less privileges, thereby making attacks less potent. Paradoxically this means that the Non-Secure Context in this sense is more secure than the Secure Context.

C. Security context according to protection: The context name denotes the protection strength against threats, meaning that Secure Context incorporates security mechanisms to prevent or mitigate specific threats, and that the Non-Secure Context has weaker, or does not have the same security mechanisms. One example of this interpretation is e.g. to define Disconnected Internet=Secure Context, and Connected Internet=Non-Secure Context, because disconnecting the Internet would radically eliminate all threats originating from the Internet. Another variant of this interpretation is to define Secure and None-Secure Contexts according to specific firewall filtering rules, or to whether external devices such as USB drives can be connected or not.

The interpretations can be used separately or in combination. As an example, the operation of a password wallet application could be classified under interpretations A) and C) meaning that it is considered as a sensitive application to be run within a separate VM according to interpretation A) and also requiring disconnection from the Internet according to interpretation C).

A remaining unsolved problem with the dual security context architecture is that the user's perception can confuse the two contexts, so that the Non-Secure Context is erroneously perceived as the Secure Context, or vice versa. Serious incidents could occur in case a user perceives that she operates and communicates with a specific computing context, when in reality she operates and communicates with another computing context. Whenever it is required that a user either selects a specific computing context, or understands which computing context she operates and communicates with, it is crucial that the intended computing context is correctly selected, and that the user has a correct perception of the computing contexts she operates and communicates with. If this requirement cannot be satisfied with high assurance many potential attacks are likely to succeed.

More specifically a compromised Non-Secure Context could e.g. be used by attackers to trick the user into providing authentication credentials in the belief that the credentials are being provided as input to the Secure Context. It is therefore important that the user is able to recognise and distinguish between the Secure Context and Non-Secure Contexts when operating a dual security context platform.

The term "operation mode" is here used to denote the particular computing context that currently is communicating in an exclusive or selective way with the user interface and/or network interface. When multiple computing contexts are processing simultaneously, it may be the case that they are connected to the user interface and/or network interface simultaneously to a certain degree. This invention relates to the case when a specific computing context has exclusive or selective communication with the user interface and/or network interface, i.e. to computing platforms for which a specific operation mode can be selected.

The inventors have recognised that to achieve this goal the user must be able to select each security context specifically, and the platform must clearly indicate which security context the user is interacting with at any time. In case the Non-Secure Context is compromised and the same I/O interface is used to interact with both security contexts, then attackers could control the Non-Secure Context to look like—and pretend to be—the Secure Context, so the user believes she interacts with the Secure Context, while in reality she interacts with the Non-Secure Context. This is a fundamental problem which when unsolved makes it impossible to achieve practical security isolation between two separate security contexts.

To illustrate what could happen in case of operation mode confusion, assume a dual-mode computing platform offering two separate and isolated computing contexts e.g. called C1 and C2, where the same I/O interface is used to interact with both modes. In case C1 is compromised the attackers could control it to look like—and pretend to be—C2, so the user believes she interacts with C2, while in reality she interacts with C1. In this way, having isolated computing contexts would not provide the intended protection because the user's confusion can be exploited to let the infection of C1 spread to C2. Operation mode confusion is a fundamental problem which when unsolved makes it impossible to achieve meaningful isolation between different computing contexts.

Computing platforms typically contain security functionality provided by specific hardware and software mechanisms. It is typically assumed that the computing platform's security related features, commonly called TCB (Trusted Computing Base) Trusted Computer System Evaluation Criteria (TCSEC). Published by US Department of Defence, 1985, function correctly in order for the security of the whole computing platform to be preserved. The TCB thus represents an abstraction that is assumed to enforce security according specific policies. In other words when the TCB breaks, this assumption no longer holds, in which case the security of the platform can get compromised.

General input and output (I/O) functions of the device are normally shared between the two security contexts, which also means that a single set of user interface channels (display, sound, camera, keyboard etc.) is used for both the Secure and Non-Secure Contexts.

A previously proposed principle for correctly displaying certified data from a public-key certificate, proposed in Audun Jøsang and Mary-Ann Patton, User Interface Requirements for Authentication of Communication. *Proceedings of the Australasian User Interface Conference*, Adelaid, 2003, is to have a reserved area for displaying certified content on the interface, and never use the reserved display area for displaying other types of content, or alternatively that the normal display is used for displaying certified content, and to use a small exclusive display area to indicate that certified content is being displayed. This provides exclusive display for certified content that can be distinguished from the display of other content. The exclusive certified content display area shall not be accessible by applications that are not considered to be part if the TCB.

Certain systems provide specific hardware driven commands to invoke low level system functions related to security. One example is the key combination CTR-ALT-DEL used in Microsoft Windows systems. This key combination interrupts other processes and invokes the OS Task Manager which runs with the highest privilege level. However, once the key combination has been pressed, there is no separate indication of the fact that the OS Task Manager is running. Also, the keyboard used to press the key combination CTR-ALT-DEL is part of the general I/O interface, and could be hijacked by malware, meaning that this specific key combination could also invoke other processes than the OS Task Manager.

Because of the known vulnerabilities of conventional computer architecture, it has been proposed to store credentials used to log in to remote servers, etc, e.g. via the Internet, in discreet hardware such as a secure external device. *User Centric Identity Management* by Simon Pope and Audun Jøsang (AusCERT Conference 2005) describes the use of a Personal Authentication Device (PAD), a secure device external to the computer, such as a smart card or other portable device. The PAD is used an identity amendment system to which the user authenticates once (with a PIN number, password or similar), and for one session, the user can authenticate to every supported service automatically using the PAD as his identity manager. This is done by secure transmission of credentials between the PAD and the server. The PAD may be connected to the server via client platform by a communication channel (e.g. wireless protocols like Bluetooth), or directly to the server via a secondary channel. In Identity Management by Audun Jøsang (URL: http://folk.uio.no/josang/im/) a variant called the OffPAD is described, which is so-called because it is intended to be (mostly) offline and therefore more secure.

However, there are disadvantages in requiring a separate device to be used, particularly if it must be provided separately (as in the case of the known OffPAD) from online devices such as smartphones and tablet computers.

According to the present invention there is provided a method and apparatus as set out in the independent claims. Thus, by means of the invention, different security contexts may be selectively connected to the Input/Output channels by a user by means of a selector and a switch function in a manner that is not vulnerable to an external security threat.

The switch function can be implemented in different ways and may comprise a separate physical selector to switch between the two security modes.

Most simply, the switch function comprises controlled hardware, either through electric contacts or through semiconductor circuitry. Thus, it may e.g. comprise micro-relays or transistor-based switches formed on semiconductor chips. Thus, in this arrangement, the switch function is outside the control of the software running on the microprocessor(s) hosting the Secure Context and Non-Secure Context.

Alternatively, the switch function is controlled by software, meaning that the routing of signals to/from the user interface to either the Secure Context or the Non-Secure Context may be controlled by software processes running on the microprocessor that also hosts the Secure Context and Non-Secure Context. The switch function control software is then preferably located at a low level (e.g. a highly privileged level such as a Kernel or Hypervisor) in the system stack, or in other highly privileged software modules. The switch function control should be arranged so it always invoked and can not be overridden by any less privileged processes on the microprocessor.

Another option is for the switch function to comprise a separate microprocessor, meaning that processes in the Secure Context and the Non-Secure Context are not running on the same microprocessor as that which controls the switch function. As a variant of this option it is possible that the switch function controller and the Secure Context are co-located on the same microprocessor, whereas the Non-Secure Context is located on an other microprocessor. It is assumed that the switch function control is always invoked and cannot be overridden by any less privileged processes on the microprocessor or by any other microprocessor.

Other preferred features of the invention are set out in the dependent claims. In particular, the invention preferably further provides a physical indicator which may be separate from the physical selector or integral therewith to show to the user whether the device is in Secure Mode or in Non-Secure Mode. Thus, each security mode can be easy to invoke, and easy for the user to recognise.

It will be appreciated that the invention may be applied to devices that have at least two separate processing capabilities that are here called "Secure Context" and "Non-Secure Context". The two security contexts can offer equal security functionality, or they can have different security functionality according to their specific security policies. Different security functionality can e.g. be that each context has its own separate firewall with its own specific configuration. e.g. when one computing context is a smartphone incorporating a phone microprocessor and SIM connected to a cellular network and the Internet, and the other computing context is an OffPAD which is offline. It would then be possible to use operate the smartphone in two modes, one where the user interfaces is connected to the phone microprocessor and SIM, and the other operation mode when the user interface is connected to the OffPAD. The user can apply the same usage policy or can apply different usage policies to the different security contexts.

For simplicity the term "Secure Context" denotes a computing context with one specific security usage and enforcement policy, and the term "Non-Secure Context" denotes the mode with another specific security usage and enforcement policy according one or several of the interpretations described herein. The relative profiles of these security policies are irrelevant; the main point is that each context is assumed to enforce different security policies, where one policy provides relatively stronger security than the other. It is assumed that the same general input/output channels are used to communicate with processes running on the both the Secure and Non-Secure Contexts. It is also assumed the processes running in each context are active and/or processing virtually simultaneously.

The terms "Secure Mode" and "Non-Secure Mode" are here used to denote that the user I/O interface is connected to processes executing under the Secure Context and the Non-Secure Context respectively. It can also mean that other I/O channels than the user interface is connected to processes running under the Secure Context and Non-Secure Context respectively.

The term "active computing context" here used to denote the computing context with which the user I/O interface is communicating in an exclusive or selective way. It can also denote the computing context with which other I/O channels, such as network interfaces, are communicating in an exclusive or selective way. The active computing context is directly determined by the operation mode.

This invention is applicable to devices that can execute processes within two different security contexts defined according to the interpretations described above, where it is assumed a separate security policy applies to each context.

The invention is equally applicable to multi-context systems with 3, 4, 5 or even more contexts (i.e. multi-context) as appropriate. However, it is particularly useful to provide two contexts, wherein one context may be online and the other context is offline or mostly offline. Thus, the offline context may be used to provide the functions of an OffPAD as previously described.

In one particularly preferred form of the invention, it is embodied in a mobile online capable device such as a smartphone or tablet computer. Thus, the OffPAD functionality may be provided by a first secure context and the remaining functionality by a second non-secure context.

Appropriate devices typically have general I/O channels, as well as user interface channels e.g. for display and audio, as well as input e.g. by keying, pointing, recording by microphone and camera. The general I/O channels and user interface channels are shared between the two security contexts but preferably only one of the two specific security contexts is active for user interface channels at any one time. The term "Secure Mode" is used to denote the mode when the user interface is exclusively connected to processes executing under the Secure Context. The term "Non-Secure Mode" is used to denote the mode when user interface is exclusively connected to processes executing under the Non-Secure Context.

In the preferred form of the invention, there are three separate interpretations of security modes, which are defined in direct correspondence with the interpretations of security contexts discussed above.

A. Security mode according to sensitivity: Under this interpretation Secure Mode and Non-Secure Mode means that the user interface is connected to the context used for relatively sensitive activities, or to the context used for relatively low sensitivity activities respectively. For example when two separate VMs represent the Secure Context and Non-Secure Context respectively, Secure Mode means that the user interface communicates with the VM defined as the secure context, whereas Non-Secure Mode means that the user interface communicates with VM defined as the Non-Secure Contest.

B. Security mode according to privilege: Under this interpretation Secure Mode and Non-Secure Mode means that the user interface is connected to processes with a relatively high access privilege level or to processes with a relatively low access privilege level respectively. For example when the OS Admin/Root Mode represents the Secure Context, and OS User Mode represents Non-Secure Context, the user would operate as Admin/Root in Secure Mode, and operate as User in Non-Secure Mode.

C. Security mode according to protection: Under this interpretation Secure Mode and Non-Secure Mode means that the user interface is connected to processes with relatively high security protection or with relatively low security protection respectively. For example when Secure Context means that the Internet is totally disconnected, and Non-Secure Context means that the Internet is connected, then the Secure Mode is when the user is interacting with processes that only execute in Secure Context, i.e. that are never connected to the Internet, and Non-Secure Mode means that the user is interacting with processes that can be (but not necessarily are) connected to the Internet.

Any practical implementation of the invention can use a single or a combination of the above interpretations. Additional options of the security modes are whether or not processes running in Non-Secure Context are halted when the device is in Secure Mode, and whether or not processes running in Non-Secure Context are halted when the device is in Secure Mode. Any option can be used, depending on the requirements for a particular implementation.

As discussed above, the invention provides a switch function for switching between the two security modes. The switch function is controlled by a selector, which can be a separate physical selector, or it can be part of the shared input interface. After a specific security mode has been selected, that security mode preferably remains active until the other security mode is selected.

The invention preferably further provides an indicator function that allows the user to observe which security mode is currently active. The indicator can be a separate physical indicator or can be implicitly indicated by the position/state of a physical security mode selector, as will be discussed more fully below.

The selector function is thus used for switching the user interface channels to be connected to the Secure Context or to the Non-Secure Context. In this way the user can switch between Secure Mode or Non-Secure Mode using a selector without interference from the processes running in any of the security contexts.

There are different options for selector type as described below.

Sel-1. The selector is physically separate from the shared user interface channels, and the active computing context can be directly observed by the physical position/state of the selector. The separate selector may or may not be under the exclusive control of the user, so it may or may not also be controlled by processes on the computing platform.

Sel-2. The selector is physically separate from the shared user interface channels, but the active computing context cannot be directly observed by the physical position/state of the selector. The separate selector may or may not be under the exclusive control of the user, so it may or may not also be controlled by processes on the computing platform.

Sel-3. The selector is part of the shared user interface channels, e.g. through a touch-screen. This option implies that the user controls the selector through processes executing within a computing context, and thereby that the selector can also be controlled by a computing context. The selector may or may not be under the exclusive control of one specific computing context.

There are different options for indicator type, as described below.

Ind-1. No separate indicator is provided, e.g. it is assumed that the selector is sufficient.

Ind-2. A physically separate indicator that is not part of the shared user interface channels is provided for the user to observe the identity of the active computing context. The separate indicator can e.g. be audible, visual, kinesthetic, or other cognitively perceivable communication modality, or any combination of these modalities. The separate physical indicator may or may not be controlled by processes running in any of the computing contexts. In case the physically separate indicator can be controlled by a computing context, this computing context is preferably a specific dedicated computing context. In case the physically separate indicator is not controlled by a computing context, it is directly or indirectly controlled by the selector.

Ind-3. A separate indicator that is part of the shared user interface channels is provided for the user to observe the identity of the active computing context. This option implies that the indicator can be controlled by a computing context. The indicator may or may not be under the exclusive control of one specific computing context, but in case it is, then this computing context is preferably a specific dedicated computing context.

Any combination of selector type and indicator type can be used in any specific implementation, but some are more preferable and meaningful than others. For example, Sel-1 and Ind-1, i.e. no separate indicator is needed when it is assumed that the separate physical selector indicates the identity of the operation mode. Another preferable and meaningful combination is Sel-2 and Ind-1, i.e. when the selector by itself does not indicate the identity of the operation mode so that a separate indicator is needed for that purpose. Some combinations will offer stronger protection against errors and malicious manipulation than other combinations. The best combination should be selected based on the needs for a specific implementation.

There are three particularly preferred combinations of selector type and indicator, type as described below.

1. The selector is physically separate from the shared user interface channels, and the active security mode can be observed by the physical position/state of the selector. The separate selector cannot be controlled by the processes on the platform, only by the user. A physically separate indicator that is not part of the shared user interface channels is provided for the user to observe whether the device is in Secure Mode or Non-Secure Mode. The indicator comes in addition to the observable separate physical selector. The separate indicator can be audible, visual, kinesthetic, or any combination of these modalities. The separate physical indicator can never be controlled by processes running in Non-Secure Context, but it is possible to let the separate physical indicator be controlled by processes running in Secure Context.
2. The selector is physically separate from the shared user interface, and the active security mode can preferably be observed by the physical position/state of the selector but alternatively it cannot. The separate selector cannot be controlled by any process on the platform, only by the user. No separate physical indicator is provided to inform the user about the active security mode of the platform.
3. The selector is part of the shared user interface channels. A physically separate indicator that is not part of the shared user interface channels is provided for the user to observe whether the device is in Secure Mode or in Non-Secure Mode. The separate indicator can be audible, visual, kinesthetic, or any combination of these modalities. The separate indicator can only be controlled by processes executing in Secure Context, not by processes executing in Non-Secure Context. The selector can be controlled by the user and by processes in Secure Context, not by processes in Non-Secure Context, but since the selector is integrated with the shared user interface channels it is possible that an attacker—through false display in Non-Secure Mode—can trick the user to operate the selector without knowing. However, the physically separate indicator will always show the current active security mode.

These three combinations are summarized in the Table 1 below.

TABLE 1

Options for selector/indicator combination

| | | Physically separate selector | |
|---|---|---|---|
| | | Yes | No |
| Physically separate indicator | Yes | Combination 1 | Combination 2 |
| | No | Combination 3 | N.A. |

As discussed above, the indicator may be used to identify the context that is in use. Identity may be explicit or implicit. It may comprise suitable attributes, which may be described using text and/or symbols. Examples are: "OffPAD"; "Phone"; "on-line banking"; and "general surfing".

The context may be indicated by the selectors, e.g. "left"; "right" or "middle" positions.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWING

An embodiment of the invention will now be described, by way of example only, and with reference to the accompanying drawings:

FIG. 1 is a schematic representation of a user and a handheld device according to an embodiment of the invention.

DETAILED DESCRIPTION

With reference to FIG. 1, the embodiment is a hand held mobile computing device 1, such as a smartphone. It is operated by a user 2.

The handheld device 1 has a housing 3 which contains a display 4, keyboard 5, microphone 6 and loudspeakers 7. These are all input/output devices connected to respective channels (not shown) in the conventional manner.

The handheld device further comprises a non-secure context 9 and a secure context 8. These are isolated so that they are each effectively separate computers, in this case comprising a processor and memory. The contexts 7, 8 are selectively connected to the input/output devices via Switch Function 10. Switch Function 10 is controlled by selector 11' and an indicator 12 is provided to indicate whether the non-secure context 8 or secure context 9 is connected to the input-output devices 4, 5, 6, 7.

The secure context 9 provides an OffPAD. As previously mentioned, an OffPAD (Offline Personal Authentication Device) is a handheld computing device that permanently, or most of the time, is disconnected from the Internet. The fact that an OffPAD is offline protects it from threats from the Internet, thereby making it suitable for hosting highly sensitive applications such as a password wallet application. A problem with implementing the OffPAD as a separate device is precisely that it is a separate physical device which can be cumbersome to carry and handle.

The embodiment avoids the need to carry a separate OffPAD device is to integrate the OffPAD functionality with e.g. a smartphone or another common computing device. As users typically carry smartphones anyway, the integration of a virtual OffPAD does not generate any extra burden on the user. Since smartphones typically are connected to the Internet e.g. via WiFi or mobile broadband channels, this solution requires a separate security context for the virtual OffPAD. More specifically, the Secure Context may be totally disconnected from the Internet, which corresponds to security context interpretation C) described above, where the Secure Context provides particularly strong protection such as shielding from the Internet. The Non-Secure Context in this regard is then used for the typical mobile smartphone activities which require Internet connection. Security context interpretations A) and B) as discussed previously can also be included in this and similar scenarios.

In order to invoke and use the OffPAD provided by the secure context 9 the user will use selector 11 to select the Secure Mode, which means that the user interface channels are exclusively communicating with processes that are disconnected from the Internet.

There have been multiple reported malware attacks on smartphones. In case of a smartphone with a dual security context architecture as described here processes connected to the Internet can be attacked in this way, but processes that are shielded from the Internet are better protected. In order to take advantage of the security protection provided by disconnecting the Internet it is crucial that the user knows which security context the user interface is connected to at any time. Should the user's perception confuse the Secure and Non-Secure Contexts then the user could e.g. be tricked to provide sensitive password information to a compromised or malicious application in the Non-Secure Context that pretends to be a secure password wallet running in the Secure Context.

The indicator 12 provides a clear and secure indication of which context is connected and so overcomes this problem.

Without this feature a compromised process in the Non-Secure Context could change its appearance in the user interface to appear as if it was running in the Secure Context, which would be difficult for the user to detect.

As the device incorporates the combinations of physical selector and indicator as it is possible for the user to know precisely when the Secure Mode or the Non-Secure Mode is active, and this whether she interacts with a process in the Secure Context or in the Non-Secure Context.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A computing apparatus which is a mobile handheld device comprising a first context within which first processing activity may be performed and a second context within which second processing activity may be performed independent of the first processing activity, wherein the first context is a secure context providing an OffPAD which is permanently or most of the time disconnected from the Internet, and the second context connects to the Internet; and wherein each context comprises a processor and memory; the apparatus further comprising input and/or output channels with which the first and second contexts may communicate and a switch function operated by a selector; whereby operation of the selector by a user selectively allows communication between either the first context or the second context (of the first part) and the input and/or output channels (of the second part); and wherein the first context is always isolated from the second context.

2. A computing apparatus as claimed in claim 1, further comprising an indicator which indicates to a user which of the first and second contexts is in communication with the input and/or output channels.

3. A computing apparatus as claimed in claim 2, wherein the indicator is physically separate from the input and/or output channels and can never be controlled by processes running in the second context.

4. A computing apparatus as claimed in claim 1, wherein each context comprises a virtual machine.

5. A computing apparatus as claimed in claim 1, wherein the selector is outside the control of software in the first or second context.

6. A computing apparatus as claimed in claim 1, wherein the selector is a physical switch which is under the exclusive control of a user.

7. A computing apparatus as claimed in claim 6, wherein the physical switch is a mechanical or electromechanical switch.

8. A computing apparatus as claimed in claim 1, wherein the switch is a semiconductor-based switch.

9. A computing apparatus as claimed in claim 1, wherein the switch function is controlled by software.

10. A computing apparatus as claimed in claim 1, wherein the switch function comprises a microprocessor separate from the microprocessor providing the first or second context.

11. A computing apparatus as claimed in claim 1, wherein the switch function allows communication between only one context and the input and/or output channels at a given time.

12. A method of operating a computing apparatus comprising providing a computing apparatus which is a mobile handheld device comprising a first context within which first processing activity may be performed and a second context within which second processing activity may be performed independent of the first processing activity, wherein the first context is a secure context providing an OffPAD which is permanently or most of the time disconnected from the Internet, and the second context connects to the Internet; and wherein each context comprises a processor and memory; the apparatus further comprising input and/or output channels with which the first and second contexts may communicate and a switch function operated by a selector; whereby operation of the selector by a user selectively allows communication between either the first context or the second context (of the first part) and the input and/or output channels (of the second part); and wherein the first context is always isolated from the second context; and using the selector to selectively allow communication between the first context and/or the second context of the first part and the input and/or output channels of the second part.

* * * * *